United States Patent
Mossner et al.

[11] 3,897,849
[45] Aug. 5, 1975

[54] BOOT ASSEMBLY FOR VEHICLE CONTROL MEMBERS AND THE LIKE

[75] Inventors: Eugene Oscar Mossner, Washington; Joseph Byron Stratton, Peoria, both of Ill.

[73] Assignee: Caterpillar Tractor Co., Peoria, Ill.

[22] Filed: Nov. 9, 1973

[21] Appl. No.: 414,242

[52] U.S. Cl. .................................. 180/90.6; 74/18
[51] Int. Cl.² ........................................ B62D 25/20
[58] Field of Search ............ 180/90.6, 89 A; 74/18, 74/18.1; 297/DIG. 6; 292/DIG. 45

[56] References Cited
UNITED STATES PATENTS

| | | | |
|---|---|---|---|
| 1,065,668 | 6/1913 | Dunham | 180/90.6 |
| 1,202,441 | 10/1916 | Small | 180/90.6 |
| 1,278,271 | 9/1918 | Wilkins | 180/90.6 |
| 1,452,431 | 4/1923 | Milkie | 180/90.6 |
| 1,495,782 | 5/1924 | Fawick | 180/90.6 X |
| 1,589,431 | 6/1926 | Saad | 180/90.6 |
| 2,226,388 | 12/1940 | Richter | 74/18.1 X |
| 3,086,609 | 4/1963 | Bryant | 180/90.6 |
| 3,185,197 | 5/1965 | Spiro | 297/DIG. 6 |
| 3,638,503 | 2/1972 | Stipanovic | 74/18 |

FOREIGN PATENTS OR APPLICATIONS

| | | | |
|---|---|---|---|
| 617,593 | 11/1926 | France | 180/90.6 |
| 225,391 | 12/1924 | United Kingdom | 180/90.6 |

Primary Examiner—David Schonberg
Assistant Examiner—Terrance L. Siemens
Attorney, Agent, or Firm—Phillips, Moore, Weissenberger Lempio & Strabala

[57] ABSTRACT

An economical, durable and easily installed flexible sleeve for disposition at an opening in a structural member through which an operator's control lever extends serves to seal the opening against dust and fumes and further serves to suppress noise transmission through the opening, without restricting necessary movement of the lever. The sleeve is formed of a flexible sheet of material which has a base edge and side edges extending from opposite ends of the base edge in convergent relationship. The sheet material is shaped to define a funnel shaped sleeve wherein the side edges are juxtaposed and joinable by a fabric closure or the like. The sleeve then has a small diameter apex through which the control lever extends and has a larger diameter base portion with outwardly extending tabs which are provided with relatively stiff flat reinforcement for disposition against the structural member around the opening. The apex portion is partially collapsed towards the structural member to create irregular folds and pleats and is clamped to the control lever.

2 Claims, 3 Drawing Figures

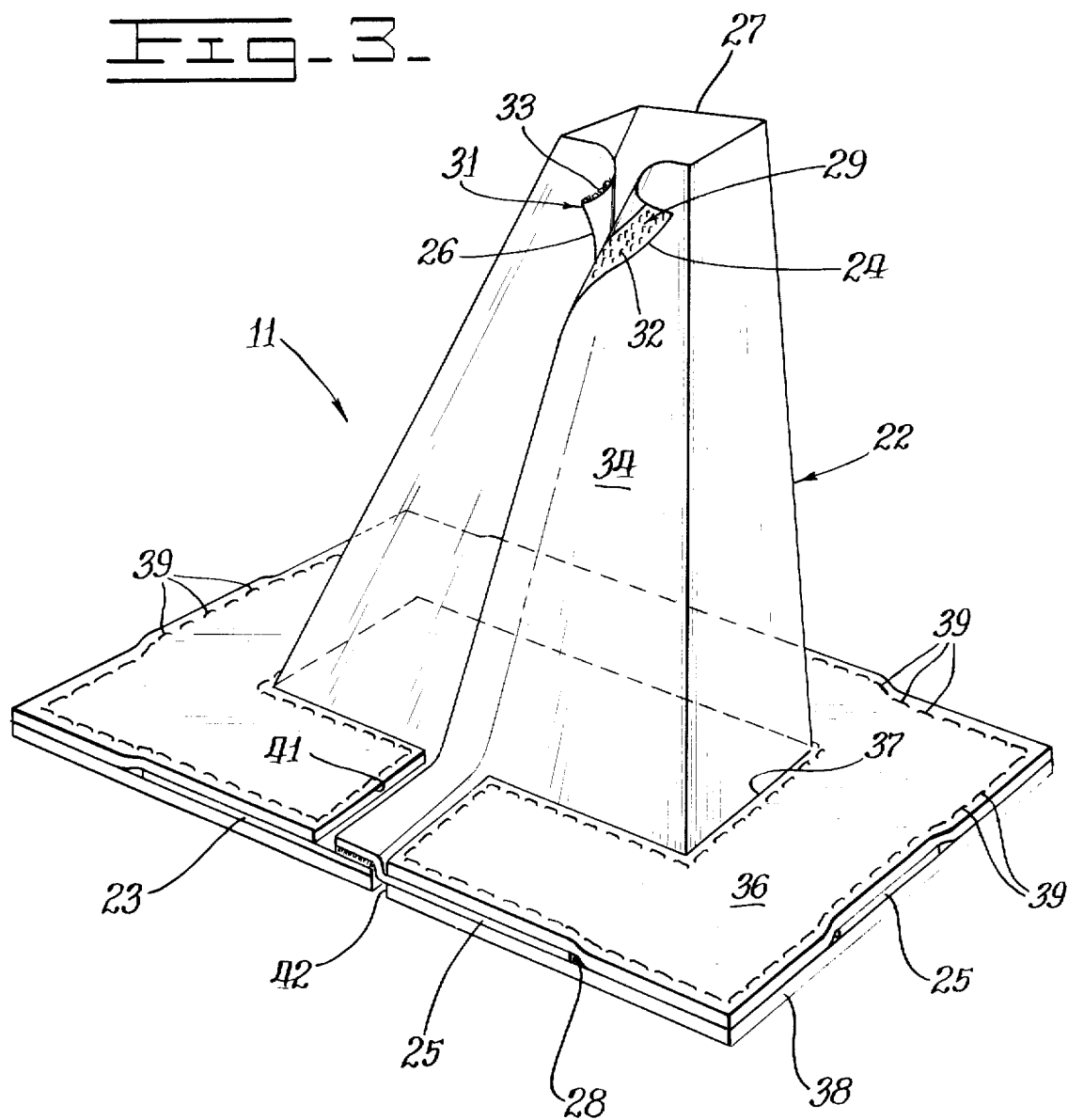

BOOT ASSEMBLY FOR VEHICLE CONTROL MEMBERS AND THE LIKE

BACKGROUND OF THE INVENTION

This invention relates to means for sealing openings in structural members through which movable elements extend, and more particularly to boot sleeves for suppressing the passage of dust, fumes, acoustical energy and the like, through such openings.

A variety of mechanisms have movable levers, rods or the like which extend through an opening in a structural member under conditions where it is desirable to prevent the passage of air, dust, fumes and the like through the opening. For example, the operator's compartment of an earthmoving vehicle generally has several such openings through which the various control levers, control pedals and the like extend. Recent increasing awareness of the detrimental effects of noise on personnel have made it desirable that the means used to seal such openings also be effective to inhibit the transmission of acoustical energy through the openings.

The openings through which the control elements or the like extend are often somewhat larger than the diameter of the control element itself. This is essential if the control element must be pivoted during operation and is also usually desirable where the control element moves only in a linear manner in order to allow for manufacturing variations in the relative position of the control element and the structural member through which it extends. In order to provide a dust seal around such openings, it has been customary to utilize a sleeve like bellows or boot formed of rubber or other elastomeric material, one end of the boot being secured around the opening in the structural member and the other end being secured to the control element which passes therethrough. These conventional rubber boots are undesirably costly and tend to have an undesirably short life due in part to repeated stretching and compression in use and in some cases because of chemical deterioration brought about by adverse environmental factors such as exposure to oil, abrasive dust and the like.

Moreover, many vehicle control elements have an enlargement such as a foot pedal, a hand-grippable knob or the like at the end which is manipulated by an operator and a conventional rubber boot cannot be readily fitted thereover. Either an excessive amount of material must be provided in the boot, or the pedal, knob or the like must be formed to be detachable from the control rod on which it is mounted or else slits must be provided along the boot which facilitate installation but detract from the sealing qualities. These problems are particularly troublesome where it is desired to install sealing means on existing vehicles or the like that were not originally designed to accommodate such means.

SUMMARY OF THE INVENTION

This invention is a low cost, durable, noise-suppressing boot assembly for sealing an opening through which a movable element extends and which is readily installable on vehicle control elements or the like of a wide variety of types including control elements which have a substantial enlargement formed integrally thereon. Thin flexible sheet material is formed to define a funnel shaped sleeve having a longitudinal opening which enables the sleeve to be readily installed around the movable element with the large diameter end which has outwardly extending tabs being disposed against the structural member through which the element passes. The longitudinal opening is then closed by means such as a fabric fastener tape and the small diameter end of the sleeve is clamped to the movable element after partially compressing the sleeve to create irregular folds and pleats which serve to suppress noise transmission. Relatively stiff flat reinforcing members may be secured to the tabs at the large diameter portion of the sleeve which is disposed against the structural member.

Accordingly, it is an object of this invention to provide an economical, durable and readily installed boot assembly for sealing an opening in a structural member through which a movable element extends.

The invention, together with further objects and advantages thereof will best be understood by reference to the following description of the preferred embodiment taken in conjunction with the accompanying drawings.

BRIEF DESCRIPTION OF THE DRAWINGS

In the accompanying drawings:

FIG. 3 is a perspective view of the boot assembly prior to installation and shown distended to better illustrate the construction of the assembly.

DESCRIPTION OF A PREFERRED EMBODIMENT

Figure 1:
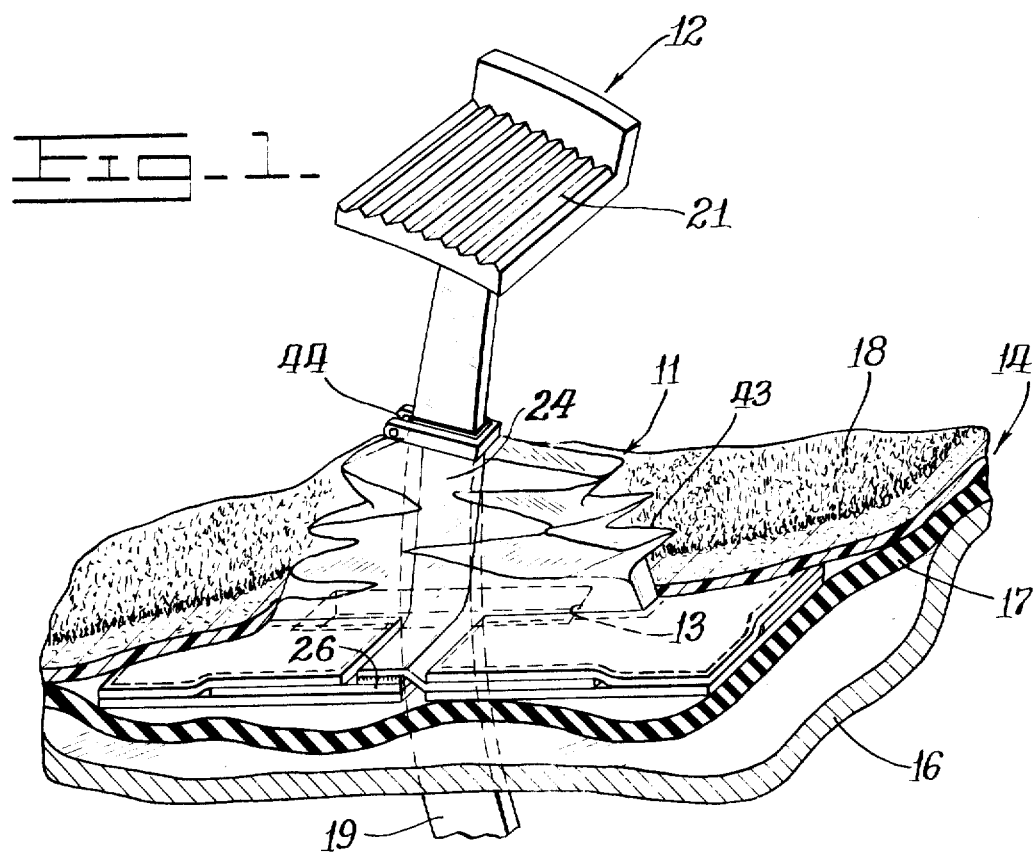
FIG. 1 is a broken out perspective view of a boot assembly shown mounted on a brake pedal of a vehicle.

Referring now to FIG. 1 of the drawing, a boot assembly 11 in accordance with the invention will be described as applied to a brake pedal 12 within the operator's compartment of an earthmoving vehicle for purposes of example, it being understood that the invention is equally applicable to other vehicle control elements or to mechanisms wherein a movable element must pass through a larger opening 13 in some structural member such as the deck 14 of the operator's compartment in this instance. In this example, the deck 14 is comprised of a rigid metal plate 16 having a layer 17 of vibration and noise suppressing material such as rubber disposed against the upper surface thereof, and having carpeting 18 resting on the rubber layer. The slot opening 13 in deck 14 enables the arcuate stem 19 of brake pedal 12 to extend upward through the deck into the operator's region.

Brake pedal 12 includes a sizeable pad 21 formed integrally on the upper end of stem 19 to facilitate depression of the stem by the operator's foot. Opening 13 is somewhat larger than the cross section of the stem 19 inasmuch as the brake pedal may undergo some pivoting movement in the course of being depressed and also to avoid the manufacturing complications which would arise from a need for precise positioning of the pedal mechanism relative to the deck. The presence of this sizeable opening 13 provides a potential route for dust, fumes and noise to enter the operator's compartment unless sealing means such as boot assembly 11 are provided.

Figure 2:
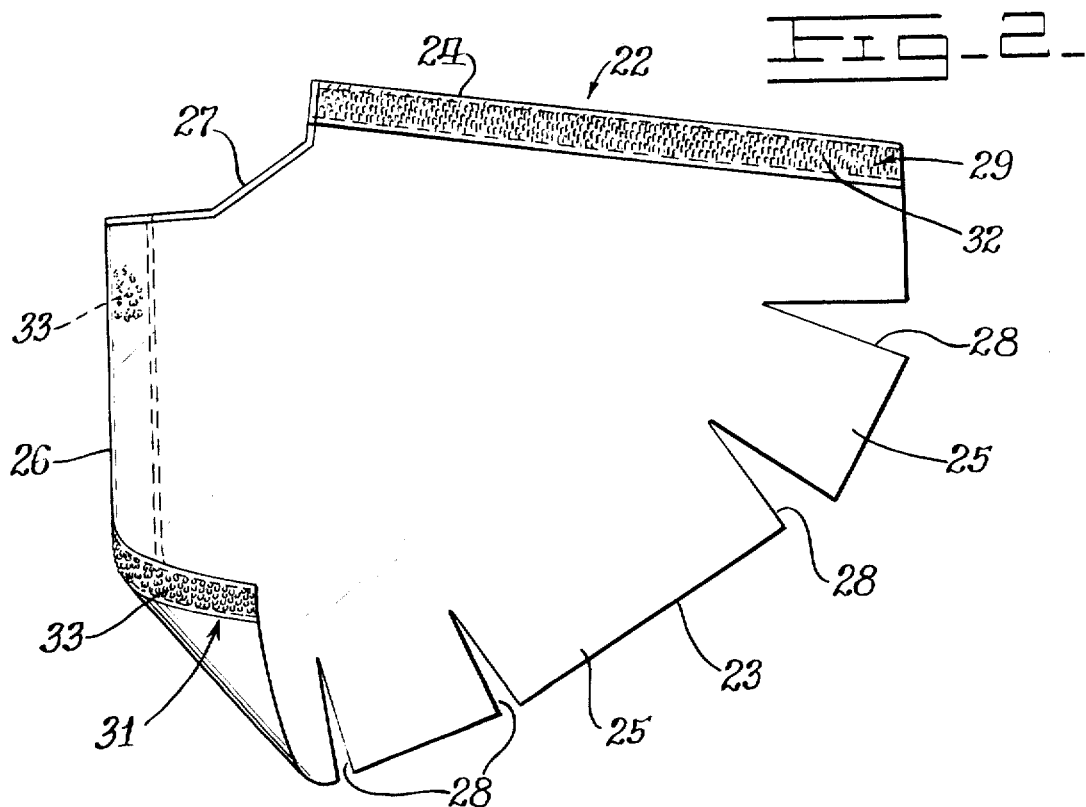
FIG. 2 is a view of a sheet of material utilized in the construction of the boot of FIG. 1, the sheet being shown in flattened condition prior to assembly with other elements of the boot.

Referring now to FIG. 2 the boot assembly includes a sheet 22 formed of flat, thin, flexible material such as vinyl plastic, for example, which need not be elastomeric, the sheet being shown in flattened form in FIG. 2 in order to better illustrate the initial configuration of the sheet. In particular, in flattened condition the sheet 22 has an approximately quarter circular form with a base edge 23 and side edges 24 and 26 which extend from opposite ends of the base edge in convergent relationship to each other. Base edge 23 has a curved configuration and the opposite end of the sheet has a cutout portion to define a smaller angled edge 27. Tapered slits 28 extend a short distance inward towards edge 27 from base edge 23 to form tabs 25 for purposes to be hereinafter described. Closure means are provided along the two side edges 22 and 26 for joining the two edges together when the sheet 22 is formed into a sleeve as will hereinafter be described in more detail. While adhesives or other means may be used for this purpose it is particularly advantageous to employ fabric strips 29 and 31 of the form in which one strip 29 has pile-like protuberances 32 that engage porosities 33 in the threads of the other strip 31 when the two strips are pressed together, suitable constructions for such fabric closures being known to the art and being described, for example, in U.S. Pat. Nos. 2,717,437 and 3,154,837. Strip 29 in this example extends along edge 24 of the sheet 22 while strip 31 extends along edge 26 thereof on the opposite surface of the sheet.

Considering now how the sheet 22 is formed into a sleeve configuration and considering further elements of the boot assembly, reference should be made to FIG. 3. Sheet 22 is formed with an upper or apex portion 34 of substantially funnel or pyramidal configuration wherein the previously described side edges 24 and 26 are brought together in slightly overlapping relationship so that the fabric strips 29 and 31 may be pressed together to close the opening along the edges. The tabs 25 are folded outward to define a flange-like base portion of the boot assembly for disposition against the flat surface of the previously described deck. A flat upper reinforcing member 36 having a central opening 37 disposed against the upper surface of the tabs 25 with the apex portions 34 of the sheet extending upwardly through the central opening. A substantially similar lower reinforcing member 38 is disposed against the underside of the tabs 25 and the upper and lower reinforcing members including the intervening tabs are joined together by suitable means such as stitching 39. Reinforcing members 36 and 38 are preferably formed of a suitable thick fabric which is relatively stiff in comparison with the plastic material of sheet 22 but still somewhat flexible. Maximum adaptability to a variety of different control lever configurations is provided for if the upper reinforcing member 36 has a slot 41 in one side extending from the central opening 37 to the outer edge of the member, the slot being positioned to expose the overlapped edges 24 and 26 of sheet 22 to facilitate engagement and disengagement of the strips 29 and 31 along the entire length thereof if necessary when the sleeve assembly is to be placed in position. The lower reinforcing member 38 may also have a slot 42 extending from the central opening to the outer edge but to facilitate engagement of the strips 29 and 31, such slot is narrower than that of the upper reinforcing member and is offset to one side of the closure strips 29 and 31 so that a portion of the lower reinforcing member 38 underlies the adjacent portion of the closure strips which may then be pressed against such underlying portion during the closure operation.

Considering now how the boot assembly 11 is disposed in position to seal an opening, the boot assembly is opened along strips 29 and 31 as illustrated in the top portion of FIG. 3 to the extent necessary to fit the assembly onto the control element or the like with which the assembly is to be associated. This may require only partial opening as illustrated in FIG. 3 or may require complete opening of the assembly all along edges 24 and 26 including opening of the reinforcing members along slots 41 and 42 depending on the configuration of the control member over which the assembly must be fitted. If it is known that the boot will not have to be completely opened for installation, stitching 39 may extend across slots 41 and 42 or the reinforcing members may be formed without such slots altogether.

Referring now to FIG. 1, the flat flanged portion of the sleeve formed by the reinforcing members 36 and 38 and tabs 25 is disposed against the structural member, such as deck 14, around the opening 13 therein which is to be sealed and is secured thereat. In this example, the high friction surface of the elastomeric layer 17 of deck 14 combined with the overlying carpeting 18 is sufficient to retain the base of the boot assembly in position, but it will be apparent that positive attachment means such as threaded fasteners, for example, can be employed if necessary.

To increase the sound suppressing ability of the boot assembly and to provide for ample slack so that the assembly will not be punctured if it is accidentally struck by the operator's foot or other objects, the upper pyramidal portion of the sheet 22 is partially collapsed toward deck 14 along the brake pedal stem 19 thereby creating irregular folds and pleats 43 of material. With the assembly partially collapsed in this manner and with the brake pedal fully extended at the unoperated position, the upper end of sheet 22 is then fastened to the pedal stem 19 by means such as a circular clamp 44. For this purpose the clamp 44 is located a distance above the deck 14 which is at least equal to the maximum downward travel of the brake pedal 12.

Accordingly, the brake pedal 12 may be freely operated in the normal manner while the boot assembly 11 provides a positive seal against the passage of dust, fumes and the like into the operator's compartment through the deck opening 13 and also substantially reduces the transmission of acoustical energy through the opening. Owing to the presence of the openable juncture formed by strips 29 and 31, the assembly 11 is readily implaced and removed and is easily fittable on pre-existing control structures without requiring disassembly of such structure.

While the invention has been described with respect to a single embodiment, it will be apparent that many modifications are possible and it is not intended to limit the invention except as defined in the following claims.

What is claimed is:

1. A boot for disposition at a passage through a structural member through which a movable element extends comprising:
   a sleeve formed from flat, non-elastomeric, flexible sheet material, said sheet material being formed into a substantially funnel shaped apex portion having a longitudinal linear opening along one side with juxtaposable edges at said linear opening, and which has a small diameter apex end and a relatively large diameter base end which is fittable against said structural member around said passage, wherein the portion of said flexible sheet material adjacent said base end thereof is slitted at a plurality of spaced apart points and folded relative to said funnel shaped apex portion thereof to form a plurality of flat outwardly extending tabs thereat, closure means for joining said juxtaposable edges of said sheet material together along said linear opening after said sleeve has been fitted against said passage and around the portion of said movable element thereat, said closure means being strips of fabric extending along facing overlapped surfaces of said edges wherein one of said strips of fabric has pile-like protuberances for engaging porosities in the threads of the other of said strips, means for securing said base end of said sleeve at said structural member around said passage including flat relatively less flexible reinforcing means attached to said tabs in parallel relationship thereto and having a central opening from which said funnel shaped apex portion of said sleeve extends and, means for securing said apex end of said sleeve to said movable element with said apex portion of said sleeve being partially collapsed to form irregular folds therein.

2. The combination defined in claim 1 wherein said reinforcing means comprises a first flat reinforcing member disposed against the sides of said tabs which face said apex portion of said sleeve and a second flat reinforcing member disposed against the opposite side of said tabs, said first and second reinforcing members and said tabs being secured together, said first reinforcing member having a slot extending between said central opening thereof and the outer edge thereof along which said closure means for said longitudinal opening of said flexible sheet material extends and said second reinforcing member having a slot extending from said central opening to the outer edge thereof but which is spaced to one side of said closure means.

* * * * *